(12) United States Patent
Hu et al.

(10) Patent No.: US 12,113,167 B2
(45) Date of Patent: Oct. 8, 2024

(54) COMPOSITE ELECTROLYTE AND SOLID-STATE BATTERY CONTAINING SAME

(71) Applicant: CONTEMPORARY AMPEREX TECHNOLOGY CO., LIMITED, Ningde (CN)

(72) Inventors: Bobing Hu, Ningde (CN); Chengyong Liu, Ningde (CN); Shangju Liao, Ningde (CN); Xiaoning He, Ningde (CN); Wenwen Xue, Ningde (CN); Zhangdi Xie, Ningde (CN); Shengyuan Huang, Ningde (CN); Jieliang Zou, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/311,904

(22) Filed: May 4, 2023

(65) Prior Publication Data
US 2024/0047736 A1   Feb. 8, 2024

Related U.S. Application Data

(63) Continuation of application No. PCT/CN2021/141842, filed on Dec. 28, 2021.

(51) Int. Cl.
*H01M 10/052* (2010.01)
*H01M 10/0562* (2010.01)
(Continued)

(52) U.S. Cl.
CPC ..... *H01M 10/0562* (2013.01); *H01M 10/052* (2013.01); *H01M 10/0565* (2013.01);
(Continued)

(58) Field of Classification Search
CPC . H01M 10/052; H01M 10/0562–0567; H01M 10/0565; H01M 2300/0068; H01M 2300/0082; H01M 2300/0091
See application file for complete search history.

(56) References Cited

U.S. PATENT DOCUMENTS 5,223,353 A * 6/1993 Ohsawa ................. H01B 1/122
                                                                429/492
5,573,872 A * 11/1996 Shackle .............. H01M 10/052
                                                                429/223
(Continued)

FOREIGN PATENT DOCUMENTS

CN   106099180 A   11/2016
CN   110416605 A   11/2019
(Continued)

OTHER PUBLICATIONS

International Search Report received in the corresponding International Application PCT/CN2021/141842, mailed Sep. 26, 2022.
(Continued)

*Primary Examiner* — Osei K Amponsah
(74) *Attorney, Agent, or Firm* — Kilpatrick Townsend & Stockton LLP (57) ABSTRACT

A composite electrolyte, including a sulfide electrolyte, a polymer electrolyte, and a functional additive material are provided. In some embodiments, the functional additive material is selected from polymers represented by the following structural $R_1$—O—$R_2$-A. In some embodiments, $R_1$ is selected from at least one of polyvinyl group, polypropylene group, polyacrylate group, polyvinylcarbonate group, polyacrylonitrile group, and polystyrene group; $R_2$ is a straight-chain or branched alkyl group with 3-10 carbon atoms; A is selected from at least one aromatic hydrocarbon group of benzene group, biphenyl group, triphenyl group, naphthalene group, anthracene group, phenanthrene group, (Continued)

and pyrene group; and X is selected from at least one of hydrogen atom, halogen atom, mercapto group, hydroxyl group, amine group, and aldehyde group.

16 Claims, 3 Drawing Sheets

(51) Int. Cl.
    *H01M 10/0565*     (2010.01)
    *H01M 10/0567*     (2010.01)
(52) U.S. Cl.
    CPC .... *H01M 10/0567* (2013.01); *H01M 2220/20* (2013.01); *H01M 2300/0068* (2013.01); *H01M 2300/0082* (2013.01); *H01M 2300/0091* (2013.01)

(56) References Cited

U.S. PATENT DOCUMENTS

| 6,395,429 B1* | 5/2002 | Kang ............... H01M 10/0565 429/317 |
| 2020/0052330 A1 | 2/2020 | Choi et al. | |

FOREIGN PATENT DOCUMENTS

| CN | 111816910 A | 10/2020 |
| CN | 112909322 A | 6/2021 |
| CN | 112909343 A | 6/2021 |
| JP | S50107090 A | 8/1975 |

OTHER PUBLICATIONS

The extended European Search Report received in the corresponding European Application 21946270.2, mailed on Jul. 12, 2024.

* cited by examiner

COMPOSITE ELECTROLYTE AND SOLID-STATE BATTERY CONTAINING SAME

CROSS-REFERENCE TO RELATED APPLICATIONS

The present application is a continuation of International Application PCT/CN2021/141842, filed Dec. 28, 2021 and entitled "COMPOSITE ELECTROLYTE AND SOLID-STATE BATTERY CONTAINING SAME", which is incorporated herein by reference in its entirety.

TECHNICAL FIELD

The present invention relates to the battery field, and in particular, to a composite electrolyte and a preparation method thereof, a solid-state battery, a battery module, a battery pack, and an electric apparatus.

BACKGROUND

In solid-state batteries, solid electrolytes are used instead of organic electrolytes, which avoid potential safety hazards caused by electrolyte leakage and other problems, thus greatly improving the safety performance of batteries. Moreover, solid-state batteries can better adapt to the high-energy-density positive and negative electrodes, implementing high energy density of batteries. Solid-state lithium metal batteries are the next-generation battery technology which is expected to combine high energy density and high safety performance. The core of this technology is the selection of solid-state electrolyte materials, among which sulfide electrolyte materials are comparable to liquid electrolytes due to their high ionic conductivity and therefore are one of the most widely studied solid-state electrolytes.

However, as inorganic ceramic materials, the sulfide materials have high mechanical hardness and poor mechanical toughness. Therefore, when encountering the volume changes of the positive and negative electrodes during charging and discharging, such sulfide materials are difficult to deform sufficiently to reduce the interface stress and maintain the interfacial contact. Especially, when the lithium metal negative electrodes experience large volume swelling, electrolyte cracking and short circuit inside batteries even occur due to continuous compression of the deposited lithium metal against the solid sulfide electrolytes.

SUMMARY

This application has been made in view of the foregoing issues, and an objective thereof is to provide a composite electrolyte capable of improving the performance of solid-state batteries.

To achieve the foregoing objective, this application provides a composite electrolyte and a preparation method thereof, and a solid-state battery, a battery module, a battery pack, and an electric apparatus containing the composite electrolyte, as described below.

A first aspect of this application provides a composite electrolyte, including a sulfide electrolyte, a polymer electrolyte, and a functional additive material, where the functional additive material is selected from polymers represented by the following structural formula (1):

formula (1)

in the formula, $R_1$ is selected from at least one of polyvinyl group, polypropylene group, polyacrylate group, polyvinylcarbonate group, polyacrylonitrile group, and polystyrene group, and optionally at least one polyolefin group of polyvinyl group, polypropylene group, and polystyrene group;

$R_2$ is a straight-chain or branched alkyl group with 3-10 carbon atoms, and optionally a straight-chain or branched alkyl group with 3-6 carbon atoms;

A is selected from at least one aromatic hydrocarbon group of benzene group, biphenyl group, triphenyl group, naphthalene group, anthracene group, phenanthrene group, and pyrene group, and optionally at least one of benzene group, biphenyl group, and naphthalene group; and X is selected from at least one of hydrogen atom, halogen atom, mercapto group, hydroxyl group, amine group, and aldehyde group, where the halogen atom may be a fluorine atom, a chlorine atom, a bromine atom, or an iodine atom.

Therefore, this application can suppress interfacial reaction between the sulfide electrolyte and the polymer electrolyte by using the functional additive material of the foregoing structure, and the performance of solid-state batteries can be improved by using such composite electrolyte.

In any embodiment, a weight average molecular weight (Mw) of the functional additive material is 2000-20000, and optionally 6000-12000. By controlling the weight average molecular weight of the functional additive material in the foregoing range, it can better coat the surface of the sulfide electrolyte and block the contact reaction with the polymer electrolyte, thereby better improving the battery performance.

In any embodiment, a percentage of the functional additive material in the composite electrolyte is 0.5 wt %-5 wt %, and optionally 1 wt %-4 wt %. This can improve the performance of solid-state batteries, including ion conductivity, discharge capacity, and capacity retention rate.

In any embodiment, a percentage of the sulfide electrolyte in the composite electrolyte is 65 wt %-90 wt %, and optionally 75 wt %-85 wt %. This can better play the role of ion transport medium of the composite electrolyte, improve ion transport performance, and increase ion conductivity.

In any embodiment, a percentage of the polymer electrolyte in the composite electrolyte is 8 wt %-34 wt %, and optionally 12 wt %-24 wt %. This can better improve the mechanical property of the sulfide electrolyte, thereby suppressing short circuit of batteries and enhancing the cycling stability.

In any embodiment, X is selected from at least one electron-rich group of halogen atom, mercapto group, hydroxyl group, amine group, and aldehyde group, optionally at least one of halogen atom, mercapto group, and hydroxyl group, and further optionally fluorine atom, chlorine atom, or mercapto group. This can better enhance the stability of the interface between the functional additive material and the sulfide electrolyte.

In any embodiment, the sulfide electrolyte is selected from one or more sulfide containing PS4 groups of Li3PS4, Li6PS5Cl, Li10GeP2S12, and Li7P3S11. This can improve ion transport performance and increase ion conductivity.

In any embodiment, the polymer electrolyte is selected from one or more of polyethylene oxide, polyvinylidene fluoride, polyvinylidene fluoride-hexafluoropropylene copolymer, polyacrylonitrile, polymethyl methacrylate, polyvinyl chloride, polycarbonate, polysulfone, polyvinylpyrrolidone, polyethylene-vinyl acetate copolymer, and polyvinyl butyral, and optionally one or more of polyethylene oxide, polyvinylidene fluoride, polyvinylidene fluoride-hexafluoropropylene copolymer, and polyacrylonitrile. This can better improve the mechanical property of the sulfide electrolyte material.

A second aspect of this application provides a preparation method of composite electrolyte, including:
 (1) providing a sulfide electrolyte and a functional additive material, mixing them uniformly, and dispersing them in a weak polar solvent to form an initial mixed solution;
 (2) subjecting the initial mixed solution to heat treatment to remove the weak polar solvent to obtain a premixed composite material; and
 (3) mixing the premixed composite material and a polymer electrolyte through ball milling to obtain a composite electrolyte.

The composite electrolyte of the first aspect of the present invention can be suitably prepared by using the foregoing preparation method. Particularly, using a weak polar solvent to perform wet mixing on the sulfide and the functional additive material helps to deliver the performance and can prevent performance degradation caused by reaction between a strong polar solvent and the sulfide electrolyte when the strong polar solvent is used.

In any embodiment, the weak polar solvent is selected from one or more of toluene, xylene, trimethylbenzene, n-hexane, cyclohexane, dichloromethane, and heptane, and optionally toluene, xylene, trimethylbenzene, and heptane. This can prepare a composite electrolyte with better performance, and in addition, these solvents have moderate boiling points, which helps to reduce solvent volatilization in the electrolyte treatment process and simplify process requirements.

A third aspect of this application further provides a solid-state battery, including the composite electrolyte according to the first aspect of this application or the composite electrolyte prepared by using the preparation method according to the second aspect of this application.

A fourth aspect of this application provides a battery module, including the solid-state battery according to the third aspect of this application.

A fifth aspect of this application provides a battery pack, including the battery module according to the fourth aspect of this application.

A sixth aspect of this application provides an electric apparatus, including at least one of the solid-state battery according to the third aspect of this application, the battery module according to the fourth aspect of this application, or the battery pack according to the fifth aspect of this application.

This application can deliver the following technical effects:

By using the functional additive material, the interfacial reaction between sulfide electrolyte and polymer electrolyte can be suppressed, the chemical stability can be enhanced, and the performance of solid-state batteries can be improved.

Reference signs are described as follows:
 1. battery pack; 2. upper box body; 3. lower box body; 4. battery module; 5. solid-state battery; 51. housing; 52. electrode assembly; and 53. top cover assembly.

DESCRIPTION OF EMBODIMENTS

The following specifically discloses embodiments of a solid-state battery, a battery module, a battery pack, and an electric apparatus in this application with appropriate reference to detailed descriptions of accompanying drawings. However, unnecessary detailed descriptions may be omitted. For example, detailed descriptions of a well-known matter or overlapping descriptions of an actual identical structure has been omitted. This is to avoid unnecessary cumbersomeness of the following descriptions to facilitate understanding by persons skilled in the art. In addition, accompanying drawings and the following descriptions are provided for persons skilled in the art to fully understand this application and are not intended to limit the subject described in the claims.

"Ranges" disclosed in this application are defined in the form of lower and upper limits, given ranges are defined by selecting lower and upper limits, and the selected lower and upper limits define boundaries of special ranges. Ranges defined in the method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if low limit values of a range are given as 1 and 2, and upper limit values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, when a parameter is expressed as an integer greater than or equal to 2, this is equivalent to disclose that the parameter is an integer among 2, 3, 4, 5, 6, 7, 8, 9, 10, 11, 12, and the like.

Unless otherwise specified, all the embodiments and optional embodiments of this application can be mutually combined to form a new technical solution.

Unless otherwise specified, all the technical features and optional technical features of this application can be mutually combined to form a new technical solution.

Unless otherwise specified, all the steps in this application can be performed sequentially or randomly, or preferably, are performed sequentially. For example, a method including steps (a) and (b) indicates that the method may include steps (a) and (b) performed in sequence, or may include steps (b) and (a) performed in sequence. For example, that the method may further include step (c) indicates that step (c) may be added to the method in any order. For example, the method may include steps (a), (b), and (c), steps (a), (c), and (b), steps (c), (a), and (b), or the like.

Unless otherwise specified, "include" and "contain" mentioned in this application are inclusive or may be exclusive. For example, terms "include" and "contain" can mean that other unlisted components may also be included or contained, or only listed components may be included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

A first aspect of this application provides a composite electrolyte, including a sulfide electrolyte, a polymer electrolyte, and a functional additive material, where the functional additive material is selected from polymers represented by the following structural formula (1):

$R_1$—O—$R_2$-A-X  formula (1)

in the formula, $R_1$ is selected from at least one of polyvinyl group, polypropylene group, polyacrylate group, polyvinylcarbonate group, polyacrylonitrile group, and polystyrene group, and optionally at least one polyolefin group of polyvinyl group, polypropylene group, and polystyrene group;

$R_2$ is a straight-chain or branched alkyl group with 3-10 carbon atoms, and optionally a straight-chain or branched alkyl group with 3-6 carbon atoms;

A is selected from at least one aromatic hydrocarbon group of benzene group, biphenyl group, triphenyl group, naphthalene group, anthracene group, phenanthrene group, and pyrene group, and optionally at least one of benzene group, biphenyl group, and naphthalene group; and X is selected from at least one of hydrogen atom, halogen atom, mercapto group, hydroxyl group, amine group, and aldehyde group.

To improve the mechanical property of the sulfide electrolyte material, a common method is to mix some polymer electrolyte materials, the most representative of which is polyethylene oxide (PEO). Due to the excellent mechanical flexibility and deformation ability of polymer materials, composite solid electrolytes prepared by using polymer and sulfide can have better mechanical property.

However, further studies have shown that poor chemical stability between sulfide and PEO-based polymers leads to backbone scission and structural damage of the polymer material during battery cycling, which consequently leads to gradual degradation of the battery performance.

The applicant fortuitously found that this application can suppress the interfacial reaction between the sulfide electrolyte and the polymer electrolyte by using the functional additive material of the foregoing structure. Groups in the polymer represented by the structural formula (1) have the following functions:

The $R_1$ group is used to provide a polymer skeleton, which needs to have good chemical stability with the sulfide, and the foregoing groups are all C—C skeletons having good chemical stability with the sulfide. In addition, the polyvinyl groups, polypropylene groups, and polystyrene groups are more preferable because of few strong polar groups therein.

The $R_2$ group is used to form steric hindrance and inhibit sulfide from attacking the C—O bond of the branched chain. If the number of carbon atoms is too small, it is not conducive to the formation of steric hindrance, or if the number of carbon atoms is too large, it is easy to lead to the intertwining of branched chains, which is not conducive to the dispersion of additives and the migration of lithium ions at the interface. A straight-chain or branched alkyl group with 3-6 carbon atoms is preferred.

The A group is used to assist in the formation of steric hindrance and improve the dispersibility of functional additive materials in weak polar solvents such as benzene and alkane, among which aromatic hydrocarbon structures are mainly selected. However, too many benzene rings lead to difficulty in the migration of lithium ions at the interface and high material cost. Therefore, the A group is preferably selected from at least one of benzene, biphenyl, and naphthalene.

The X group is used to form the chemical bond with cations in the sulfide to improve the interfacial affinity with the sulfide electrolyte. Such X group has strong electron capture and bond forming ability or sulfide affinity.

In some embodiments, X is selected from at least one electron-rich group of halogen atom, mercapto group, hydroxyl group, amine group, and aldehyde group, optionally at least one of halogen atom, mercapto group, and hydroxyl group, and further optionally fluorine atom, chlorine atom, or mercapto group. The electron-rich group needs to have strong electron capture and bond forming ability or sulfide affinity, and therefore can further improve the interfacial affinity with the sulfide electrolyte. Introducing electron-rich groups is to form chemical bonds with cations in sulfides, which helps to maintain good interfacial contact with sulfides during long-term cycling and increase capacity retention rate, meaning enhancing interfacial stability.

The functional additive material having the foregoing specified structure can build a highly stable interface between the sulfide electrolyte and the polymer electrolyte, and can suppress the interface reaction between the sulfide electrolyte and the polymer electrolyte.

In some embodiments, a percentage of the functional additive material in the composite electrolyte is 0.5 wt %-5 wt %, and optionally 1 wt %-4 wt %.

As described above, the functional additive is mainly used to build a highly stable interface between the sulfide electrolyte and the polymer electrolyte. Too little additive is difficult to achieve improvement effects, and too much additive affects the ion transport capability of the interface, resulting in a decrease in the electrochemical performance of the solid-state electrolyte.

In some embodiments, a weight average molecular weight of the functional additive material is 2000-20000, and optionally 6000-12000.

When the molecular weight of the functional additive material is too low, the mechanical strength is low and the molecular chain segment is very short, making the functional additive material difficult to effectively coat the surface of the sulfide material and block the contact reaction with the polymer electrolyte, which is not conducive to improving the battery performance. When the molecular weight is too high, the chain segment of the added material is too long, which limits the migration of lithium ions at the interface, the mechanical rigidity is enhanced, which is not conducive to maintaining good interfacial contact, and accordingly the electrochemical performance is attenuated.

In some embodiments, a percentage of the sulfide electrolyte in the composite electrolyte is 65 wt %-90 wt %, and optionally 75 wt %-85 wt %.

The sulfide electrolyte acts as a lithium ion transport medium. When the percentage of the sulfide electrolyte is low, its conductivity is relatively low, which is not conducive to capacity extraction of the solid-state battery. When the percentage of the sulfide electrolyte is too high, due to its high mechanical brittleness, the sulfide electrolyte is prone to crack and other problems under the influence of the uneven stress distribution inside the battery, which leads to the short circuit inside the battery.

In some embodiments, the sulfide electrolyte is selected from one or more sulfide containing PS4 groups of Li3PS4, Li6PS5Cl, Li10GeP2S12, and Li7P3S11. This can improve ion transport performance and increase ion conductivity.

In some embodiments, a percentage of the polymer electrolyte in the composite electrolyte is 8 wt %-34 wt %, and optionally 12 wt %-24 wt %.

The polymer electrolyte is used to improve the mechanical property of the sulfide electrolyte, thereby suppressing short circuit of batteries and enhancing the cycling stability. When the percentage of the polymer electrolyte is low, the cycling stability is not enhanced well, and the battery has the risk of short circuit. When the percentage is high, the bulk phase ion transport is affected because the conductivity of polymer is much lower than that of sulfide, which is not conducive to battery capacity extraction.

In some embodiments, the polymer electrolyte is selected from one or more of polyethylene oxide, polyvinylidene fluoride, polyvinylidene fluoride-hexafluoropropylene copolymer, polyacrylonitrile, polymethyl methacrylate, polyvinyl chloride, polycarbonate, polysulfone, polyvinylpyrrolidone, polyethylene-vinyl acetate copolymer, and polyvinyl butyral, and optionally one or more of polyethylene oxide, polyvinylidene fluoride, polyvinylidene fluoride-hexafluoropropylene copolymer, and polyacrylonitrile. This can better improve the mechanical property of the sulfide electrolyte, thereby suppressing short circuit of batteries and enhancing the cycling stability.

A second aspect of this application provides a preparation method of composite electrolyte, including the following steps:
  (1) providing a sulfide electrolyte and a functional additive material, mixing them uniformly, and dispersing them in a weak polar solvent to form an initial mixed solution;
  (2) subjecting the initial mixed solution to heat treatment to remove the weak polar solvent to obtain a premixed composite material; and
  (3) mixing the premixed composite material and a polymer electrolyte through ball milling to obtain a composite electrolyte. The preparation method can be applied to prepare the composite electrolyte according to the first aspect of this application.

The solvent is used to disperse the sulfide electrolyte. Because there are side reactions between the sulfide and the strong polar solvent, which leads to material decomposition and conductivity decrease. Therefore, it is necessary to choose a weak polar solvent. In addition, choosing solvents with moderate boiling points can help to reduce solvent volatilization in electrolyte treatment and simplify process requirements.

In some embodiments, the weak polar solvent is selected from one or more of toluene, xylene, trimethylbenzene, n-hexane, cyclohexane, dichloromethane, and heptane, and optionally toluene, xylene, trimethylbenzene, and heptane.

In addition, the following describes a solid-state battery, a battery module, a battery pack, and an electric apparatus in this application with appropriate reference to the accompanying drawings.

An embodiment of this application provides a solid-state battery. The solid-state battery generally includes a positive electrode plate, a negative electrode plate, and a solid-state electrolyte membrane disposed between the positive electrode plate and the negative electrode plate. The solid-state electrolyte membrane can include the composite electrolyte according to the first aspect of the present invention.

[Positive Electrode Plate]

The positive electrode plate includes a positive electrode current collector and a positive electrode film layer disposed on at least one surface of the positive electrode current collector, and the positive electrode film layer includes a positive electrode active substance.

In an example, the positive electrode current collector includes two back-to-back surfaces in a thickness direction of the positive electrode current collector, and the positive electrode film layer is disposed on either or both of the two back-to-back surfaces of the positive electrode current collector.

In some embodiments, the positive electrode current collector may be a metal foil or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the positive electrode active substance may be a positive electrode active substance for batteries well known in the art. In an example, the positive electrode active substance may include at least one of the following materials: olivine-structured lithium-containing phosphate, lithium transition metal oxide, and respective modified compounds thereof. However, this application is not limited to these materials, and other conventional materials that can be used as positive electrode active substances for batteries may also be used. One type of these positive electrode active substances may be used alone, or two or more types may be used in combination. An example of the lithium transition metal oxide may include but is not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ ($NCM_{333}$ for short), $LiNi_{0.5}Co_{0.2}Mn_{0.3}O_2$ ($NCM_{523}$ for short), $LiNi_{0.5}Co_{0.25}Mn_{0.25}O_2$ ($NCM_{211}$ for short), $LiNi_{0.6}Co_{0.2}Mn_{0.2}O_2$ ($NCM_{622}$ for short), and $LiNi_{0.8}Co_{0.1}Mn_{0.1}O_2$ ($NCM_{811}$ for short)), lithium nickel cobalt aluminum oxide (for example, $LiNi_{0.85}Co_{0.15}Al_{0.05}O_2$), and modified compounds thereof. An example of the olivine-structured lithium-containing phosphate may include but is not limited to at least one of lithium iron phosphate (for example, $LiFePO_4$ (LFP for short)), a composite material of lithium iron phosphate and carbon, lithium manganese phosphate (for example, $LiMnPO_4$), a composite material of lithium manganese phosphate and carbon, lithium manganese iron phosphate, and a composite material of lithium manganese iron phosphate and carbon.

In some embodiments, the positive electrode film layer further optionally includes a binder. In an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode film layer further optionally includes a conductive agent. In an example, the conductive agent may include at least one of superconducting carbon, acetylene black, carbon black, Ketjen black, carbon dots, carbon nanotubes, graphene, and carbon nanofibers.

In some embodiments, the positive electrode plate may be prepared by using the following manners: dissolving the constituents used for preparing the positive electrode plate, for example, the positive electrode active substance, the conductive agent, the binder, and any other constituent (for example, the sulfide electrolyte materials listed above) in a solvent (for example, N-methylpyrrolidone) to form a positive electrode slurry, applying the positive electrode slurry onto the positive electrode current collector, and performing processes such as drying and cold pressing to obtain the positive electrode plate.

[Negative Electrode Plate]

The negative electrode plate includes a negative electrode current collector and a negative electrode film layer disposed on at least one surface of the negative electrode current collector, and the negative electrode film layer includes a negative electrode active material.

In an example, the negative electrode current collector includes two back-to-back surfaces in a thickness direction of the negative electrode current collector, and the negative electrode film layer is disposed on either or both of the two back-to-back surfaces of the negative electrode current collector.

In some embodiments, the negative electrode current collector may be a metal foil or a composite current collector. In an example, a copper foil may be used as the metal foil. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the negative electrode active material may be a negative electrode active material for batteries well known in the art. In an example, the negative electrode active material may include at least one of the following materials: lithium metal, artificial graphite, natural graphite, soft carbon, hard carbon, a silicon-based material, a tin-based material, lithium titanate, and the like. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials, and other conventional materials that can be used as negative electrode active materials for batteries may also be used. One type of these negative electrode active materials may be used alone, or two or more types may be used in combination.

In some embodiments, the negative electrode film layer further optionally includes a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from at least one of superconducting carbon, acetylene black, carbon black, Ketjen black, carbon dots, carbon nanotubes, graphene, and carbon nanofibers.

In some embodiments, the negative electrode film layer further optionally includes other adjuvants such as a thickener (for example, sodium carboxymethyl cellulose (CMC-Na)).

In some embodiments, the negative electrode plate may be prepared in the following manners: dissolving the constituents used for preparing the negative electrode plate, for example, the negative electrode active material, the conductive agent, the binder, and any other constituents, in a solvent (for example, deionized water) to form a negative electrode slurry, applying the negative electrode slurry onto the negative electrode current collector, and performing processes such as drying and cold pressing to obtain the negative electrode plate.

In some embodiments, the negative electrode plate may be prepared in the following manners: making the lithium metal foil and the current collector substrate pass through stainless steel counter-rollers, physically fitting them under rolling conditions to form a lithium metal negative electrode, and subjecting them to cold pressing and cutting to obtain the negative electrode plate.

[Solid-State Electrolyte]

The solid-state electrolyte may be prepared into a solid-state electrolyte membrane through a dry chemistry method for membrane preparation or a wet chemistry method for membrane preparation. The solid-state electrolyte membrane is located between the positive electrode plate and the negative electrode plate.

The dry chemistry method for membrane preparation is as follows: placing the solid-state electrolyte in a mold and pressing it into a membrane. The pressing method may be cold pressing or hot pressing. The pressing method may be one-step pressing or step-by-step pressing. The hot pressing pressure is 0.1-500 MPa, and preferably 100-400 MPa; and the hot pressing temperature is 25-160° C., and preferably 60-120° C. If the hot pressing pressure is too small and the temperature is too low, the packing fraction of the solid-state electrolyte membrane is low. However, too large hot pressing pressure indicates high requirements for devices, and too high hot pressing temperature easily leads to decomposition of the solid-state electrolyte.

The wet chemistry method for membrane preparation is as follows: mixing the solid-state electrolyte and the binder in an organic solvent, stirring the mixed solution to form a slurry, applying the slurry on a glass substrate, and subjecting the resulting product to drying and pressing to obtain an electrolyte membrane. The optional ranges of the binder and organic solvent may be identical to those of the foregoing binder and organic solvent used in the preparation of the positive electrode plate in the present invention.

In the present invention, the solid-state electrolyte is a composite electrolyte, which includes a sulfide electrolyte, a polymer electrolyte, and a functional additive material, where the functional additive material is selected from polymers represented by the following structural formula (1):

$$R_1\text{—}O\text{—}R_2\text{-}A\text{-}X \qquad \text{formula (1)}$$

in the formula, $R_1$ is selected from at least one of polyvinyl group, polypropylene group, polyacrylate group, polyvinylcarbonate group, polyacrylonitrile group, and polystyrene group, and optionally at least one polyolefin group of polyvinyl group, polypropylene group, and polystyrene group;

$R_2$ is a straight-chain or branched alkyl group with 3-10 carbon atoms, and optionally a straight-chain or branched alkyl group with 3-6 carbon atoms;

A is selected from at least one aromatic hydrocarbon group of benzene group, biphenyl group, triphenyl group, naphthalene group, anthracene group, phenanthrene group, and pyrene group, and optionally at least one of benzene group, biphenyl group, and naphthalene group; and X is selected from at least one of hydrogen atom, halogen atom, mercapto group, hydroxyl group, amine group, and aldehyde group, and may be selected from at least one electron-rich group of halogen atom, mercapto group, hydroxyl group, amine group, and aldehyde group, optionally at least one of halogen atom, mercapto group, and hydroxyl group, and further optionally fluorine atom, chlorine atom, or mercapto group.

In some embodiments, the sulfide electrolyte is selected from one or more sulfide containing $PS_4$ groups of $Li_3PS_4$, $Li_6PS_5Cl$, $Li_{10}GeP_2S_{12}$, and $Li_7P_3S_{11}$.

In some embodiments, a percentage of the sulfide electrolyte in the composite electrolyte is 65 wt %-90 wt %, and optionally 75 wt %-85 wt %.

Sulfide electrolyte materials are comparable to liquid electrolytes due to their high ionic conductivity and therefore are one of the most widely studied solid-state electrolytes. However, as inorganic ceramic materials, the sulfide materials have high mechanical hardness and poor mechanical toughness. Therefore, when encountering the volume changes of the positive and negative electrodes during charging and discharging, such sulfide materials are difficult to deform sufficiently to reduce the interface stress and maintain the interfacial contact. Especially, when the lithium metal negative electrodes experience large volume swelling, electrolyte cracking and short circuit inside batteries even occur due to continuous compression of the deposited lithium metal against the solid sulfide electrolytes. To improve the mechanical property of sulfide electrolyte materials, a common way is to add some polymer electrolyte materials. Due to the excellent mechanical flexibility and deformation ability of polymer materials, composite solid electrolytes prepared by using polymer and sulfide can have better mechanical property.

In some embodiments, the polymer electrolyte is selected from one or more of polyethylene oxide, polyvinylidene fluoride, polyvinylidene fluoride-hexafluoropropylene copolymer, polyacrylonitrile, polymethyl methacrylate, polyvinyl chloride, polycarbonate, polysulfone, polyvinylpyrrolidone, polyethylene-vinyl acetate copolymer, and polyvinyl butyral, and optionally one or more of polyethylene oxide, polyvinylidene fluoride, polyvinylidene fluoride-hexafluoropropylene copolymer, and polyacrylonitrile.

In some embodiments, a percentage of the polymer electrolyte in the composite electrolyte is 8 wt %-34 wt %, and optionally 12 wt %-24 wt %.

However, further studies have shown that poor chemical stability between the sulfide electrolyte and the polymer electrolyte leads to backbone scission and structural damage of the polymer material during battery cycling, which consequently leads to gradual degradation of the battery performance. Therefore, in the present invention, the functional additive material of the foregoing specified structure is added.

The $R_1$ group is used to provide a polymer skeleton, which needs to have good chemical stability with the sulfide. The $R_2$ group is used to form steric hindrance and inhibit sulfide from attacking the C—O bond of the branched chain. The A group is used to form steric hindrance and improve the dispersibility of additives in weak polar solvents such as benzene and alkane. The X group is used to form the chemical bond with cations in the sulfide to improve the interfacial affinity with the sulfide electrolyte. Such functional additive material can build a highly stable interface between the sulfide electrolyte and the polymer electrolyte, thereby improving the battery performance.

In some embodiments, a percentage of the functional additive material in the composite electrolyte is 0.5 wt %-5 wt %, and optionally 1 wt %-4 wt %.

In some embodiments, a weight average molecular weight of the functional additive material is 2000-20000, and optionally 6000-12000. When the molecular weight of the functional additive material is too low, the mechanical strength is low and the molecular chain segment is very short, making the functional additive material difficult to effectively coat the surface of the sulfide material and block the contact reaction with the polymer electrolyte, which is not conducive to improving the battery performance. When the molecular weight is too high, the chain segment of the added material is too long, which limits the migration of lithium ions at the interface, the mechanical rigidity is enhanced, which is not conducive to maintaining good interfacial contact, and accordingly the electrochemical performance is attenuated.

[Preparation Method of Composite Electrolyte]

The preparation method of composite electrolyte of the present invention includes the following steps:

(1) providing a sulfide electrolyte and a functional additive material, mixing them uniformly, and dispersing them in a weak polar solvent to form an initial mixed solution;

(2) subjecting the initial mixed solution to heat treatment to remove the weak polar solvent to obtain a premixed composite material; and (3) mixing the premixed composite material and a polymer electrolyte through ball milling to obtain a composite electrolyte.

The solvent is used to disperse the sulfide electrolyte. Because there are side reactions between the sulfide and the strong polar solvent, which leads to material decomposition and conductivity decrease. Therefore, it is necessary to choose a weak polar solvent.

In some embodiments, the weak polar solvent is selected from one or more of toluene, xylene, trimethylbenzene, n-hexane, cyclohexane, dichloromethane, and heptane.

In addition, choosing solvents with moderate boiling points helps to reduce solvent volatilization in electrolyte treatment and simplify process requirements. Preferred solvents are toluene, xylene, mesitylene, and heptane.

[Preparation Method of Solid-State Battery]

For the solid-state battery of the present invention, the positive electrode plate, the negative electrode plate, and the solid-state electrolyte membrane may be made into an electrode assembly through winding or lamination.

In some embodiments, the positive electrode plate, the solid-state electrolyte membrane, and the negative electrode plate are respectively cut based on the required sizes, the resulting positive electrode plate, solid electrolyte membrane, and negative electrode plate after cutting are aligned to center and stacked in sequence to form a sandwiched unit, and the sandwiched unit is compacted and laminated together at a special temperature to obtain a cell of a solid-state battery. After cold pressing, the cell is packaged in the outer package to form the solid-state battery. The compaction pressure may be 1-500 MPa, and preferably 100-300 MPa; and the compacted temperature may be 20-160° C., and preferably 60-120° C.

In some embodiments, the solid-state battery may include an outer package. The outer package is used for packaging the electrode assembly and the electrolyte.

In some embodiments, the outer package of the solid-state battery may be a hard shell, for example, a hard plastic shell, an aluminum shell, or a steel shell. The outer package of the solid-state battery may alternatively be a soft pack, for example, a soft pouch. A material of the soft pack may be plastic. As the plastic, polypropylene, polybutylene terephthalate, polybutylene succinate, and the like may be listed.

Figure 1:
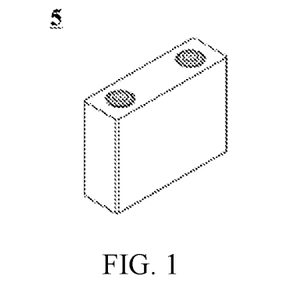
FIG. 1 is a schematic diagram of a solid-state battery according to an embodiment of this application.

FIG. 1 shows a solid-state battery 5 of a rectangular structure as an example.

Figure 2:
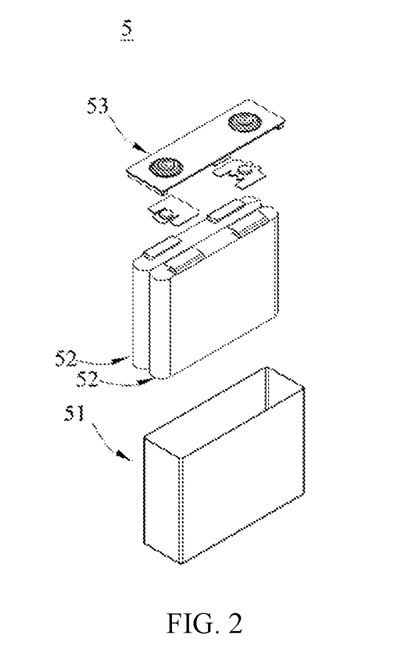
FIG. 2 is an exploded view of the solid-state pack according to the embodiment of this application in FIG. 1.

In some embodiments, referring to FIG. 2, the outer package may include a housing 51 and a cover plate 53. The housing 51 may include a base plate and a side plate connected onto the base plate, and the base plate and the side plate enclose an accommodating cavity. The housing 51 has an opening communicating with the accommodating cavity, and the cover plate 53 can cover the opening to close the accommodating cavity. A positive electrode plate, a negative electrode plate, and a solid-state electrolyte membrane may be made into an electrode assembly 52 through winding or lamination. The electrode assembly 52 is packaged in the accommodating cavity. There may be one or more electrode assemblies 52 in the solid-state battery 5, and persons skilled in the art may make choices according to actual requirements.

In some embodiments, solid-state batteries may be assembled into a battery module, and the battery module may include one or more solid-state batteries. A specific quantity may be chosen by persons skilled in the art based on use and capacity of the battery module.

Figure 3:
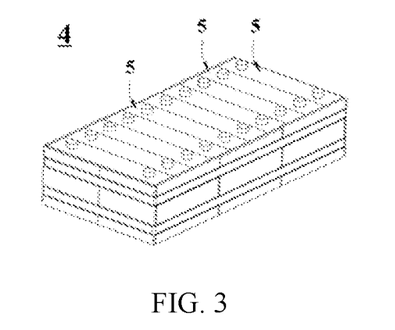
FIG. 3 is a schematic diagram of a battery module according to an embodiment of this application.

FIG. 3 shows a battery module 4 as an example. Referring to FIG. 3, in the battery module 4, a plurality of solid-state batteries 5 may be sequentially arranged in a length direction of the battery module 4. Certainly, the solid-state batteries may alternatively be arranged in any other manner. Further, the plurality of solid-state batteries 5 may be fastened by fasteners.

Optionally, the battery module 4 may further include a housing with an accommodating space, and the plurality of solid-state batteries 5 are accommodated in the accommodating space.

In some embodiments, the battery modules may be further assembled into a battery pack, and the battery pack may include one or more battery modules. A specific quantity may be chosen by persons skilled in the art based on use and capacity of the battery pack.

Figure 4:
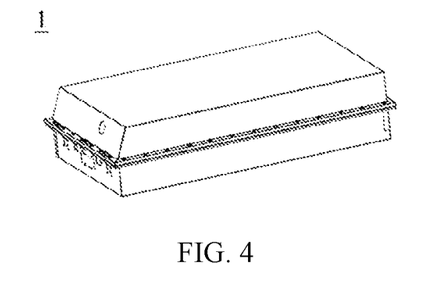
FIG. 4 is a schematic diagram of a battery pack according to an embodiment of this application.
Figure 5:
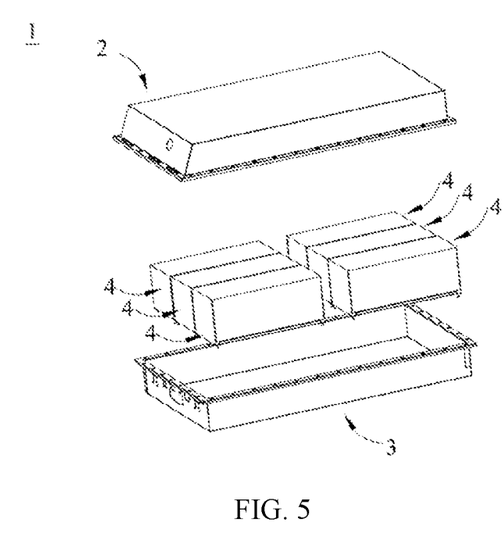
FIG. 5 is an exploded view of the battery pack according to the embodiment of this application in FIG. 4.

FIG. 4 and FIG. 5 show a battery pack 1 as an example. Referring to FIG. 4 and FIG. 5, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

In addition, this application further provides an electric apparatus. The electric apparatus includes at least one of the solid-state battery, the battery module, or the battery pack provided in this application. The solid-state battery, the battery module, or the battery pack may be used as a power source of the electric apparatus, or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, and the like, but is not limited thereto.

The solid-state battery, the battery module, or the battery pack may be selected for the electric apparatus based on requirements for using the electric apparatus.

Figure 6:
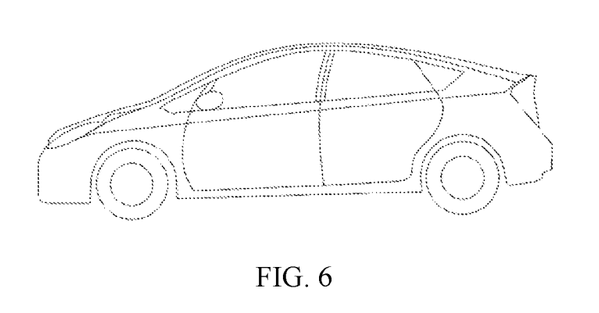
FIG. 6 is a schematic diagram of an electric apparatus using a solid-state battery as a power source according to an embodiment of this application.

FIG. 6 shows an electric apparatus as an example. The electric apparatus is a battery electric vehicle, a hybrid electric vehicle, a plug-in hybrid electric vehicle, or the like. To satisfy a requirement of the electric apparatus for high power and high energy density of the solid-state battery, a battery pack or a battery module may be used.

In another example, the apparatus may be a mobile phone, a tablet computer, a notebook computer, or the like. Such apparatus is usually required to be light and thin, for which the solid-state battery may be used as a power source.

Examples

The following describes examples in this application. The examples described below are exemplary and only used to explain this application, but cannot be understood as a limitation on this application. Examples whose technical solutions or conditions are not specified are made based on technical solutions or conditions described in documents in the art, or made based on the product specification. The reagents or instruments used are all conventional products that can be purchased on the market if no manufacturer is indicated.

Test Method (1) Ionic Conductivity Test

The solid-state electrolyte was pressed into a wafer at a pressure of 300 MPa, and a stainless steel sheet was used as a current collector on each of two sides of the solid-state electrolyte wafer; ohmic resistance of the solid-state electrolyte wafer was measured using an electrochemical workstation from CH Instruments, with a test temperature of 25° C., a frequency range of 1 Hz-1 MHz, and a perturbation signal of 5 mV; and based on the resistance R, thickness d, and area S of the solid-state electrolyte wafer, the ion conductivity (mS/cm) could be calculated using the following formula:

$$\text{Ionic conductivity} = d/RS$$

(2) Discharge Capacity Test

A LAND tester was used to test the charge and discharge capacities of the solid-state battery. First charging and discharging was performed in a 25° C. environment, constant-current charging was performed at a charge current of 0.1C (that is, a current at which a theoretical capacity is completely discharged within 10 hours), and the constant-voltage charging was performed until an upper-limit voltage was 4.2 V; then constant-current discharging was performed at a discharge current of 0.1C until a final voltage was 2.8 V, and a discharge capacity at the first cycle was recorded.

(3) Test for Capacity Retention Rate after 100 Cycles

The LAND tester was used to test the charge and discharge capacities of the solid-state battery. First charging and discharging was performed in a 25° C. environment, constant-current charging was performed at a charge current of 0.1C (that is, a current at which a theoretical capacity is completely discharged within 10 hours), and the constant-voltage charging was performed until an upper-limit voltage was 4.2 V; then constant-current discharging was performed at a discharge current of 0.1C until a final voltage was 2.8 V, and discharge capacities at the first cycle and the 100th cycle were recorded. The capacity retention rate after 100 cycles was calculated by using the following formula:

Capacity retention rate after 100 cycles=Discharge capacity of the 100th cycle/Discharge capacity of the first cycle×100%

Synthetic Examples of Functional Additive Material

Synthetic Example 1

Styryl vinyl ether (200 g, manufacturer: Aldlab Chemicals) used as the polymerized monomer was subjected to water scrubbing to remove impurities, and then dried under reduced pressure in a vacuum chamber at room temperature for 1 hour; and the impurity-removed styryl vinyl ether (100 g) was put into a polymerizer, and $BF_3$ (2 g, manufacturer: Aladdin) was added as an initiator to form a homogeneous mixture. Then, nitrogen was used for replacement three times, and the reaction system was set to be in a nitrogen atmosphere.

Diethyl ether (0.2 g, manufacturer: Aladdin) used as an capping agent was added to control the polymer molecular weight, and the foregoing homogeneous mixture was heated to 100° C. in the nitrogen atmosphere (pressure: 101.3 kPa) for polymerization, and was stirred for 120 minutes during polymerization to make the reaction end. After the reaction was ended, nitrogen was introduced into the reactor, the normal pressure was restored, and the polymerization product was taken out.

Such polymerization product was subjected to ethanol solvent (manufacturer: Aladdin) scrubbing and vacuum treatment to remove residual impurities and low-boiling-point small molecules, so as to obtain functional additive material 1.

Synthetic Example 2

A functional additive material 2 was obtained in the same manner as in Synthetic Example 1, except that the polymerization monomer was replaced with chlorophenylbutyl vinyl ether and the polymerization time was changed to 150 minutes.

Synthetic Example 3

A functional additive material 3 was obtained in the same manner as in Synthetic Example 2, except that the polymerization monomer was replaced with chlorophenylbutyl styrene ether.

Synthetic Example 4

A functional additive material 4 was obtained in the same manner as in Synthetic Example 2, except that the polymerization monomer was replaced with chlorophenylbutyl acrylate ether.

Synthetic Example 5

A functional additive material 5 was obtained in the same manner as in Synthetic Example 2, except that the polymerization monomer was replaced with chlorophenylpropyl vinyl ether.

Synthetic Example 6

A functional additive material 6 was obtained in the same manner as in Synthetic Example 2, except that the polymerization monomer was replaced with chlorophenylhexyl vinyl ether.

Synthetic Example 7

A functional additive material 7 was obtained in the same manner as in Synthetic Example 2, except that the polymerization monomer was replaced with fluorophenylbutyl vinyl ether.

Synthetic Example 8

A functional additive material 8 was obtained in the same manner as in Synthetic Example 2, except that the polymerization monomer was replaced with mercaptophenylbutyl vinyl ether.

Synthetic Example 9

A functional additive material 9 was obtained in the same manner as in Synthetic Example 2, except that the polymerization monomer was replaced with chlorobiphenylbutyl vinyl ether.

Synthetic Example 10

A functional additive material 10 was obtained in the same manner as in Synthetic Example 2, except that the polymerization monomer was replaced with chloronaphthalene butyl vinyl ether.

Synthetic Example 11

A functional additive material 11 was obtained in the same manner as in Synthetic Example 2, except that the polymerization monomer was replaced with butyl vinyl ether.

Synthetic Example 12

A functional additive material 12 was obtained in the same manner as in Synthetic Example 2, except that the polymerization time was changed to 20 minutes and the amount of ether added was changed to 1 g.

Synthetic Example 13

A functional additive material 13 was obtained in the same manner as in Synthetic Example 2, except that the polymerization time was changed to 30 minutes and the amount of ether added was changed to 0.6 g.

Synthetic Example 14

A functional additive material 14 was obtained in the same manner as in Synthetic Example 2, except that the polymerization time was changed to 60 minutes and the amount of ether added was changed to 0.4 g.

Synthetic Example 15

A functional additive material 15 was obtained in the same manner as in Synthetic Example 2, except that the polymerization time was changed to 180 minutes and the amount of ether added was changed to 0.15 g.

Synthetic Example 16

A functional additive material 16 was obtained in the same manner as in Synthetic Example 2, except that the polymerization time was changed to 300 minutes and the amount of ether added was changed to 0.1 g.

Synthetic Example 17

A functional additive material 17 was obtained in the same manner as in Synthetic Example 2, except that the polymerization time was changed to 600 minutes and the amount of ether added was changed to 0.02 g.

Characterization of Functional Additive Material

The actual molecular weights of the foregoing synthesized functional additive materials were measured by using the following gel permeation chromatography (GPC) method, and the results are shown in Table A below.

The molecular weight is the weight average molecular weight (Mw), and its determination method is as follows:
using gel permeation chromatography (GPC), using chloroform as a developing solvent, and using standard polystyrene (PStQuick MP-M, manufactured by Tosoh Corporation) with a known molecular weight (molecular weight distribution=1) to prepare a standard curve; and performing, by using a cubic formula, approximation on determined elution times and molecular weight values that correspond to all peaks of the standard polystyrene to obtain a curve, and using the resulting curve as a calibration curve.

[Determination Condition]
Apparatus: Tosoh Corporation, HLC-8320GPC
Chromatographic column: guardcolumn: TSKguardcolumn SuperMPHZ-M×1
Analytical column: TSKgel SuperMultiporeHZ-M×3
Solvent: HPLC grade chloroform
Injection volume: 10 μL
Sample concentration: 0.2 w/v % HPLC grade chloroform solution
Solvent flow rate: 0.35 ml/min
Test temperature: 40° C.
Tester: RI Based on the obtained calibration curve, the weight average molecular weight (Mw) was found as a polystyrene equivalent value by using the following calculation formula.

$$Mw = \Sigma(Wi \times Mi) \div \Sigma(Wi)$$ [Calculation formula]

(In the formula, i represents the i-th dividing point when the molecular weight M is divided, Wi represents the weight at the i-th dividing point, Ni represents the number of molecules at the i-th dividing point, and Mi represents the molecular weight at the i-th dividing point. In addition, the molecular weight M represents the polystyrene molecular weight values corresponding to a same elution time in the calibration curve.)

TABLE A

| Number of functional additive material | $R_1$ | $R_2$ | A | X | Theoretical molecular weight | Actual molecular weight |
|---|---|---|---|---|---|---|
| 1 | Polyethylene | Butyl | Benzene | H | 10000 | 10300 |
| 2 | Polyethylene | Butyl | Benzene | Cl | 10000 | 9500 |
| 3 | Polystyrene | Butyl | Benzene | Cl | 10000 | 9200 |
| 4 | Polyacrylic ester | Butyl | Benzene | Cl | 10000 | 9000 |
| 5 | Polyethylene | Propyl | Benzene | Cl | 10000 | 10500 |
| 6 | Polyethylene | Hexyl | Benzene | Cl | 10000 | 10100 |
| 7 | Polyethylene | Butyl | Benzene | F | 10000 | 10500 |
| 8 | Polyethylene | Butyl | Benzene | SH | 10000 | 10500 |
| 9 | Polyethylene | Butyl | Biphenyl | Cl | 10000 | 10300 |
| 10 | Polyethylene | Butyl | Naphthalene | Cl | 10000 | 10300 |
| 11 | Polyethylene | Butyl | — | — | 10000 | 9900 |
| 12 | Polyethylene | Butyl | Benzene | Cl | 1000 | 900 |
| 13 | Polyethylene | Butyl | Benzene | Cl | 2000 | 2200 |
| 14 | Polyethylene | Butyl | Benzene | Cl | 6000 | 6400 |
| 15 | Polyethylene | Butyl | Benzene | Cl | 12000 | 12500 |
| 16 | Polyethylene | Butyl | Benzene | Cl | 20000 | 19100 |
| 17 | Polyethylene | Butyl | Benzene | Cl | 50000 | 51500 |

Example 1

1. Preparation of Battery Cell
(1) Preparation of Positive Electrode Plate

A positive electrode active material LiFePO$_4$, an electrolyte material Li$_6$PS$_5$Cl, a conductive agent Super-P, and a binder styrene-butadiene rubber were mixed in a mass ratio of 70:24:3:3, with a solvent toluene added. The mixture was stirred by using a vacuum stirrer to a uniform system to obtain a positive electrode slurry. The positive electrode slurry was uniformly applied on two surfaces of a positive electrode current collector aluminum foil, and the product was dried at room temperature and transferred to an oven for drying, followed by cold pressing and cutting, to obtain a positive electrode plate.

(2) Preparation of Negative Electrode Plate

A lithium metal foil and a current collector substrate were made to pass through stainless steel counter-rollers and physically fitted under rolling conditions to form a lithium metal negative electrode, which was subjected to cold pressing and cutting to obtain a negative electrode plate.

(3) Preparation of Composite Electrolyte Membrane

The sulfide electrolyte $Li_6PS_5Cl$ and the functional additive material 1 synthesized above were uniformly mixed in a weight ratio of 78:2, and dispersed in a weak polar solvent n-hexane. After being stirred and dispersed uniformly, the sulfide material and the functional additive material were fully mixed to form an initial mixed solution. The initial mixed solution was heated and dried in a vacuum environment to remove n-hexane to obtain a pre-mixed composite material. The pre-mixed composite material was mixed with polyethylene oxide (PEO) based polymer electrolyte, so that the percentage of the polymer electrolyte in the composite electrolyte was 20 wt %. Then ball milling was performed to achieve uniform mixing, and finally the composite electrolyte material was obtained.

The composite electrolyte slurry was uniformly applied on the surface of the substrate, which was in turn dried at room temperature and then transferred to an oven for further drying, followed by cutting to obtain a composite electrolyte membrane.

(4) Preparation of Solid-State Battery

The positive electrode plate, composite solid-state electrolyte membrane, and lithium metal negative electrode prepared using the above preparation method were stacked in sequence, and pressed at 300 MPa to prepare a solid-state battery.

2. Performance Test for Solid-State Battery

The ionic conductivity, discharge capacity, and capacity retention rate after 100 cycles of the obtained solid-state battery were measured as described in the foregoing "determination method", and the results are shown in Table 1 below.

Examples 2 to 27

The solid-state batteries were prepared in the same manner as in Example 1, except that the composition or percentage of the composite electrolyte and the type of the weak polar solvent were changed as shown in Table 1. Also, the ionic conductivity, discharge capacity, and capacity retention rate after 100 cycles of the obtained solid-state battery of the examples were measured as described in the foregoing "determination method", and the results are shown in Table 1 below.

Comparative Examples 1 to 4

The solid-state batteries were prepared in the same manner as in Example 1, except that the composition or percentage of the composite electrolyte and the presence of the weak polar solvent were changed as shown in Table 2.

Also, the ionic conductivity, discharge capacity, and capacity retention rate after 100 cycles of the obtained solid-state battery of the comparative examples were measured as described in the foregoing "determination method", and the results are shown in Table 2 below.

TABLE 1

| | Sulfide electrolyte material | Percentage of sulfide electrolyte (wt %) | Percentage of polymer electrolyte (wt %) | Percentage of functional additive material (wt %) | Number of functional additive material | Weak polar solvent | Ionic conductivity (mS/cm) | Discharge capacity (mAh/g) | Capacity retention rate after 100 cycles (%) |
|---|---|---|---|---|---|---|---|---|---|
| Example 1 | $Li_6PS_5Cl$ | 78 | 20 | 2 | 1 | N-hexane | 1.8 | 124 | 81 |
| Example 2 | $Li_6PS_5Cl$ | 79.9 | 20 | 0.1 | 2 | N-hexane | 2.1 | 129 | 70 |
| Example 3 | $Li_6PS_5Cl$ | 79.5 | 20 | 0.5 | 2 | N-hexane | 2.0 | 128 | 83 |
| Example 4 | $Li_6PS_5Cl$ | 79 | 20 | 1 | 2 | N-hexane | 1.9 | 127 | 89 |
| Example 5 | $Li_6PS_5Cl$ | 78 | 20 | 2 | 2 | N-hexane | 1.9 | 126 | 91 |
| Example 6 | $Li_6PS_5Cl$ | 76 | 20 | 4 | 2 | N-hexane | 1.5 | 124 | 91 |
| Example 7 | $Li_6PS_5Cl$ | 75 | 20 | 5 | 2 | N-hexane | 1.3 | 122 | 88 |
| Example 8 | $Li_6PS_5Cl$ | 70 | 20 | 10 | 2 | N-hexane | 0.8 | 106 | 76 |
| Example 9 | $Li_6PS_5Cl$ | 88 | 10 | 2 | 2 | N-hexane | 2.8 | 135 | 83 |
| Example 10 | $Li_6PS_5Cl$ | 93 | 5 | 2 | 2 | N-hexane | 3.6 | 140 | Short circuit |
| Example 11 | $Li_6PS_5Cl$ | 48 | 50 | 2 | 2 | N-hexane | 0.34 | 96 | 72 |
| Example 12 | $Li_6PS_5Cl$ | 68 | 30 | 2 | 2 | N-hexane | 1.2 | 120 | 89 |
| Example 13 | $Li_6PS_5Cl$ | 78 | 20 | 2 | 2 | Xylene | 2.0 | 129 | 89 |
| Example 14 | $Li_6PS_5Cl$ | 78 | 20 | 2 | 2 | Heptane | 1.7 | 124 | 87 |
| Example 15 | $Li_{10}GeP_2S_{12}$ | 78 | 20 | 2 | 2 | N-hexane | 3.4 | 133 | 90 |
| Example 16 | $Li_6PS_5Cl$ | 78 | 20 | 2 | 3 | N-hexane | 1.8 | 126 | 90 |
| Example 17 | $Li_6PS_5Cl$ | 78 | 20 | 2 | 4 | N-hexane | 1.4 | 118 | 85 |
| Example 18 | $Li_6PS_5Cl$ | 78 | 20 | 2 | 5 | N-hexane | 1.7 | 122 | 88 |
| Example 19 | $Li_6PS_5Cl$ | 78 | 20 | 2 | 6 | N-hexane | 1.5 | 119 | 86 |

TABLE 1-continued

| | Sulfide electrolyte material | Percentage of sulfide electrolyte (wt %) | Percentage of polymer electrolyte (wt %) | Percentage of functional additive material (wt %) | Number of functional additive material | Weak polar solvent | Ionic conductivity (mS/cm) | Discharge capacity (mAh/g) | Capacity retention rate after 100 cycles (%) |
|---|---|---|---|---|---|---|---|---|---|
| Example 20 | $Li_6PS_5Cl$ | 78 | 20 | 2 | 7 | N-hexane | 1.2 | 113 | 83 |
| Example 21 | $Li_6PS_5Cl$ | 78 | 20 | 2 | 8 | N-hexane | 1.8 | 125 | 89 |
| Example 22 | $Li_6PS_5Cl$ | 78 | 20 | 2 | 9 | N-hexane | 1.7 | 124 | 88 |
| Example 23 | $Li_6PS_5Cl$ | 78 | 20 | 2 | 10 | N-hexane | 1.9 | 127 | 90 |
| Example 24 | $Li_6PS_5Cl$ | 78 | 20 | 2 | 13 | N-hexane | 1.8 | 123 | 81 |
| Example 25 | $Li_6PS_5Cl$ | 78 | 20 | 2 | 14 | N-hexane | 1.9 | 125 | 88 |
| Example 26 | $Li_6PS_5Cl$ | 78 | 20 | 2 | 15 | N-hexane | 2.0 | 126 | 89 |
| Example 27 | $Li_6PS_5Cl$ | 78 | 20 | 2 | 16 | N-hexane | 1.8 | 122 | 80 |

TABLE 2

| | Sulfide electrolyte material | Percentage of sulfide electrolyte (wt %) | Percentage of polymer electrolyte (wt %) | Percentage of functional additive material (wt %) | Number of functional additive material | Weak polar solvent | Ionic conductivity (mS/cm) | Discharge capacity (mAh/g) | Capacity retention rate after 100 cycles (%) |
|---|---|---|---|---|---|---|---|---|---|
| Comparative Example 1 | $Li_6PS_5Cl$ | 80 | 20 | / | / | / | 2.1 | 128 | 64 |
| Comparative Example 2 | $Li_6PS_5Cl$ | 78 | 20 | 2 | 11 | / | 1.7 | 120 | 69 |
| Comparative Example 3 | $Li_6PS_5Cl$ | 78 | 20 | 2 | 12 | N-hexane | 1.7 | 120 | 74 |
| Comparative Example 4 | $Li_6PS_5Cl$ | 78 | 20 | 2 | 17 | N-hexane | 1.6 | 119 | 76 |

It can be learned from the results that the examples basically show good effects in terms of ionic conductivity, discharge capacity, and capacity retention rate after 100 cycles. Comparatively, the comparative examples do not all achieve good results in the above-mentioned evaluation performance test.

Specifically, in Comparative Example 1, no functional additive is used, and therefore the capacity retention rate after 100 cycles is low. In Comparative Example 2, although the functional additive material is used, the aromatic hydrocarbon group is not used, for the A group in particular in the structure. Therefore, the capacity retention rate after 100 cycles is low. The molecular weight of the functional additive material of Comparative Example 3 is too low, and therefore the capacity retention rate after 100 cycles is low. The molecular weight of the functional additive material of Comparative Example 4 is too high, and therefore the capacity retention rate after 100 cycles is low.

It should be noted that this application is not limited to the foregoing examples. The foregoing embodiments are merely examples, and embodiments having constructions substantially the same as those of the technical idea and having the same effects as the technical idea within the scope of the technical solutions of this application are all included in the technical scope of this application. In addition, within the scope without departing from the essence of this application, various modifications that can be conceived by persons skilled in the art are applied to the embodiments, and other modes constructed by combining some of the constituent elements in the embodiments are also included in the scope of this application.

The invention claimed is:

1. A composite electrolyte, comprising a sulfide electrolyte, a polymer electrolyte, and a functional additive material, wherein the functional additive material is selected from one or more polymers represented by the following structural formula (1):

$R_1$—O—$R_2$-A-X, wherein $R_1$ represents a main chain of the polymer, and —O—$R_2$-A-Z represents a side chain of the polymer, $R_1$ is selected from at least one of polyvinyl main chain group, polypropylene main chain group, polyacrylate main chain group, polyvinylcarbonate main chain group, polyacrylonitrile main chain group, and polystyrene main chain group;

$R_2$ is a straight-chain or branched alkyl group with 3-10 carbon atoms;

A is selected from at least one aromatic hydrocarbon group of benzene group, biphenyl group, triphenyl group, naphthalene group, anthracene group, phenanthrene group, and pyrene group; and X is selected from at least one of halogen atom, mercapto group, hydroxyl group, amine group, and aldehyde group.

2. The composite electrolyte according to claim 1, wherein a percentage of the functional additive material in the composite electrolyte is 0.5 wt %-5 wt %.

3. The composite electrolyte according to claim 1, wherein
a percentage of the sulfide electrolyte in the composite electrolyte is 65 wt %-90 wt %.

4. The composite electrolyte according to claim 1, wherein
a percentage of the polymer electrolyte in the composite electrolyte is 8 wt %-34 wt %.

5. The composite electrolyte according to claim 1, wherein
X is selected from at least one electron-rich group of halogen atom, mercapto group, hydroxyl group, amine group, and aldehyde group, optionally at least one of halogen atom, mercapto group, and hydroxyl group, and further optionally fluorine atom, chlorine atom, or mercapto group.

6. The composite electrolyte according to claim 1, wherein
a weight average molecular weight of the functional additive material is 2000-20000.

7. The composite electrolyte according to claim 1, wherein
the sulfide electrolyte is selected from one or more sulfide containing $PS_4$ groups of $Li_3PS_4$, $Li_6PS_5Cl$, $Li_{10}GeP_2S_{12}$, and $Li_7P_3S_{11}$.

8. The composite electrolyte according to claim 1, wherein
the polymer electrolyte is selected from one or more of polyethylene oxide, polyvinylidene fluoride, polyvinylidene fluoride-hexafluoropropylene copolymer, polyacrylonitrile, polymethyl methacrylate, polyvinyl chloride, polycarbonate, polysulfone, polyvinylpyrrolidone, polyethylene-vinyl acetate copolymer, and polyvinyl butyral, and optionally one or more of polyethylene oxide, polyvinylidene fluoride, polyvinylidene fluoride-hexafluoropropylene copolymer, and polyacrylonitrile.

9. A preparation method of composite electrolyte, comprising:
(1) providing a sulfide electrolyte and a functional additive material, mixing them uniformly, and dispersing them in a weak polar solvent to form an initial mixed solution;
(2) subjecting the initial mixed solution to heat treatment to remove the weak polar solvent to obtain a premixed composite material; and
(3) mixing the premixed composite material and a polymer electrolyte through ball milling to obtain a composite electrolyte; wherein
the composite electrolyte comprises the sulfide electrolyte, the polymer electrolyte, and the functional additive material, wherein the functional additive material is selected from one or more polymers represented by the following structural formula (1):
$R_1$—O—$R_2$-A-X formula (1), wherein $R_1$ represents a main chain of the polymer, and —O—$R_2$-A-Z represents a side chain of the polymer,
$R_1$ is selected from at least one of polyvinyl main chain group, polypropylene main chain group, polyacrylate main chain group, polyvinylcarbonate main chain group, polyacrylonitrile main chain group, and polystyrene main chain group;
$R_2$ is a straight-chain or branched alkyl group with 3-10 carbon atoms;
A is selected from at least one aromatic hydrocarbon group of benzene group, biphenyl group, triphenyl group, naphthalene group, anthracene group, phenanthrene group, and pyrene group; and
X is selected from at least one of halogen atom, mercapto group, hydroxyl group, amine group, and aldehyde group.

10. The preparation method according to claim 9, wherein
the weak polar solvent is selected from one or more of toluene, xylene, trimethylbenzene, n-hexane, cyclohexane, dichloromethane, and heptane, and optionally toluene, xylene, trimethylbenzene, and heptane.

11. A solid-state battery, comprising the composite electrolyte according to claim 1.

12. A battery module, comprising the solid-state battery according to claim 11.

13. A battery pack, comprising the battery module according to claim 12.

14. An electric apparatus, comprising at least one of the solid-state batteries according to claim 11.

15. The composite electrolyte according to claim 1, wherein the functional additive material is selected from the group consisting of a polymer of chlorophenyl butyl vinyl ether, a polymer of chlorophenyl butoxyl styrene, a polymer of chlorophenylbutyl acrylate, a polymer of chlorophenylpropyl vinyl ether, a polymer of chlorophenylhexyl vinyl ether, a polymer of fluorophenylbutyl vinyl ether, a polymer of mercaptophenylbutyl vinyl ether, a polymer chlorobiphenylbutyl vinyl ether, a polymer of chloronaphthalene butyl vinyl ether, and any combinations thereof.

16. The preparation method according to claim 9, wherein the functional additive material is selected from the group consisting of a polymer of chlorophenyl butyl vinyl ether, a polymer of chlorophenyl butoxyl styrene, a polymer of chlorophenylbutyl acrylate, a polymer of chlorophenylpropyl vinyl ether, a polymer of chlorophenylhexyl vinyl ether, a polymer of fluorophenylbutyl vinyl ether, a polymer of mercaptophenylbutyl vinyl ether, a polymer chlorobiphenylbutyl vinyl ether, a polymer of chloronaphthalene butyl vinyl ether, and any combinations thereof.

* * * * *